US005687466A

United States Patent [19]

Flores

[11] Patent Number: 5,687,466

[45] Date of Patent: Nov. 18, 1997

[54] MAINTENANCE RACK FOR POWER SYSTEM RECLOSERS

[76] Inventor: Carlos Flores, 1514 S. Kentucky, Roswell, N. Mex. 88201

[21] Appl. No.: 436,845

[22] Filed: May 8, 1995

[51] Int. Cl.$^{6}$ .................. B23Q 7/00; B23Q 1/25

[52] U.S. Cl. .................. 29/402.03; 29/559; 269/71

[58] Field of Search .................. 29/559, 402.01, 29/402.03, 402.04; 269/17, 71, 15; 248/130; 312/305; 108/29

[56] References Cited

U.S. PATENT DOCUMENTS

| | | | |
|---|---|---|---|
| 1,273,981 | 7/1918 | Adams | 269/17 |
| 1,415,968 | 5/1922 | Wilson | 269/15 |
| 1,933,382 | 10/1933 | Monroe | 248/130 |
| 1,948,522 | 2/1934 | Jacobs | 248/130 |
| 4,010,942 | 3/1977 | Ward | 269/17 |
| 4,335,544 | 6/1982 | Manson | 29/559 |
| 4,530,492 | 7/1985 | Bork | 269/17 |
| 4,688,686 | 8/1987 | Mitts et al. | 312/305 |
| 4,838,530 | 6/1989 | Chyba et al. | 269/17 |
| 5,358,227 | 10/1994 | Bennett et al. | 269/71 |

OTHER PUBLICATIONS

Klye Service Stands (Undated) by McGraw-Edison Power Systems.

*Primary Examiner*—David P. Bryant
*Assistant Examiner*—Tisa Stewart
*Attorney, Agent, or Firm*—Victor Flores

[57] ABSTRACT

A maintenance rack device for use in the performance of a maintenance, or service task on large electrical utility equipment known as reclosers. The maintenance rack includes a portable tiered frame structure adapted with tiered service members that support reclosers that have a mechanical configuration equivalent to those known in the power distribution industry as type R, W, 6h and V6H reclosers. The tiered service members include opposing support plates that support a first type of reclosers and which facilitate removal of the recloser head covers to gain access to the recloser mechanism. A second service member includes a rotatable service bar member for attachment to a second type of recloser and subsequently to the frame structure for manipulating the recloser mechanism that is to be serviced. The reclaser maintenance rack eliminates having to use tables, barrels to service the recloser devices.

2 Claims, 3 Drawing Sheets

MAINTENANCE RACK FOR POWER SYSTEM RECLOSERS

FIELD OF THE INVENTION

The present invention relates to apparatus used to aid in the performance of a maintenance, or service task on a bulky, heavy, piece of equipment. More particularly, the present invention relates to rack apparatus used to aid in the performance of a maintenance, or service task on large electrical utility apparatus known as tee losers. Even more particularly, the present invention relates to a dual-purpose maintenance rack apparatus used to aid in the performance of a maintenance, or service task on at least two types of large electrical utility apparatus known as reclosers.

BACKGROUND OF THE INVENTION

Reclosers are used extensively by the utility industry in managing the distribution of electrical energy to increase the continuity, reduce system operating costs, and increase revenue. An important aspect of recloser equipment is that they be maintained to assure proper and peak efficiency operation when needed. Although the actual maintenance on the reclosers is relatively easy and inexpensive, the physical size of reclosers renders the task to perform the maintenance considerably difficult, often unsafe and time consuming. Generally, the service task begins on reclosers that have been placed out-of-service. There are only a few physical outlines for reclosers that are of concern. One type is known in the industry as Type R or Type W. The Type R/W reclosers require removal of a head cover prior to servicing the recloser mechanism. The other type is known in the industry as Type 6H or Type V6H. The 6H and V6H reclosers differ from the Type W and Type R reclosers in that they do not have a head cover that needs to be removed prior to servicing the recloser mechanism. Additionally, the 6H/V6H reclosers have attachment means that facilitate attachment of a mechanical interface for hoisting the unit about a service area. While the description of the present invention discusses recloser Types R/W and 6H/V6H, other reclosers having similar mechanical design as these reclosers may be serviced by the maintenance rack of the present invention. Service techniques for effecting the maintenance is not standard and include the use of tables, hoists barrels and other non-systematic aids. One known accessory for servicing reclosers is the Kyle service stand available from McGraw-Edison Power System. The Kyle stand is not deemed effective for servicing a recloser in that it lacks means for positioning the reclosers for disassembly, for effecting access to disassemble the head cover from the recloser mechanism and lacks means for setting the recloser at a comfortable height for performing a service task. Additionally, the Kyle stand cannot facilitate rotating recloser a servicing the mechanism from different directions.

SUMMARY OF THE INVENTION

Accordingly, the primary object of the present invention is to provide a maintenance rack that facilitates servicing reclosers used in the power distribution industry.

A particular object of the present invention is to provide a maintenance rack that facilitates servicing, in a suspended manner, reclosers of the type that require removal of a head cover to gain access to the recloser mechanism.

A more particular object of the present invention is to provide a maintenance rack that facilitates servicing, in a suspended manner, reclosers of the type that require removal of a head cover to gain access to the recloser mechanism by including opposing support plates at different elevations in a tiered frame structure.

Another particular object of the present invention is to provide a maintenance rack that facilitates servicing, in a suspended manner, reclosers of the type that have mounting means to effect a suspended service task.

A more particular object of the present invention is to provide a maintenance rack that facilitates servicing, in a rotatable suspended manner, reclosers of the type that have mounting means to effect a suspended service task.

Another particular object of the present invention is to provide a maintenance rack that not only facilitates servicing, in a suspended manner, reclosers of the type that require removal of a head cover to gain access to the recloser mechanism, but that also facilitates servicings in a suspended manner, reclosers of the type that have mounting means to effect a suspended service task.

The foregoing objects are accomplished by providing a maintenance rack for aid in servicing multiple types of recloser equipment. The rack preferably comprises a tiered frame structure having at least one tier member defining an open area flanked by a first and second support plate. The open area and each of the first and second support plates, being sized for accommodating a suspended support of a first type of recloser that requires removal of a head cover to gain access to the recloser mechanism. The tiered frame structure may optionally provide a second tier member consisting of a rotatable bar member mounted on opposing pivot support members that attach to the frame structure. The rotatable bar member being formed for attaching a second type of recloser equipment in a non-inverted position and performing a first service task, and formed for rotating an attached second type of reclosers that have mounting means to effect a suspended service task.

Therefore, to the accomplishments of the foregoing objects, the invention consists of the foregoing features hereinafter fully described and particularly pointed out in the claims, the accompanying drawings and the following disclosure describing in detail the invention, such drawings and disclosure illustrating the preferred embodiment in which the invention may be practiced.

DESCRIPTION OF THE PREFERRED EMBODIMENT

Figure 1:
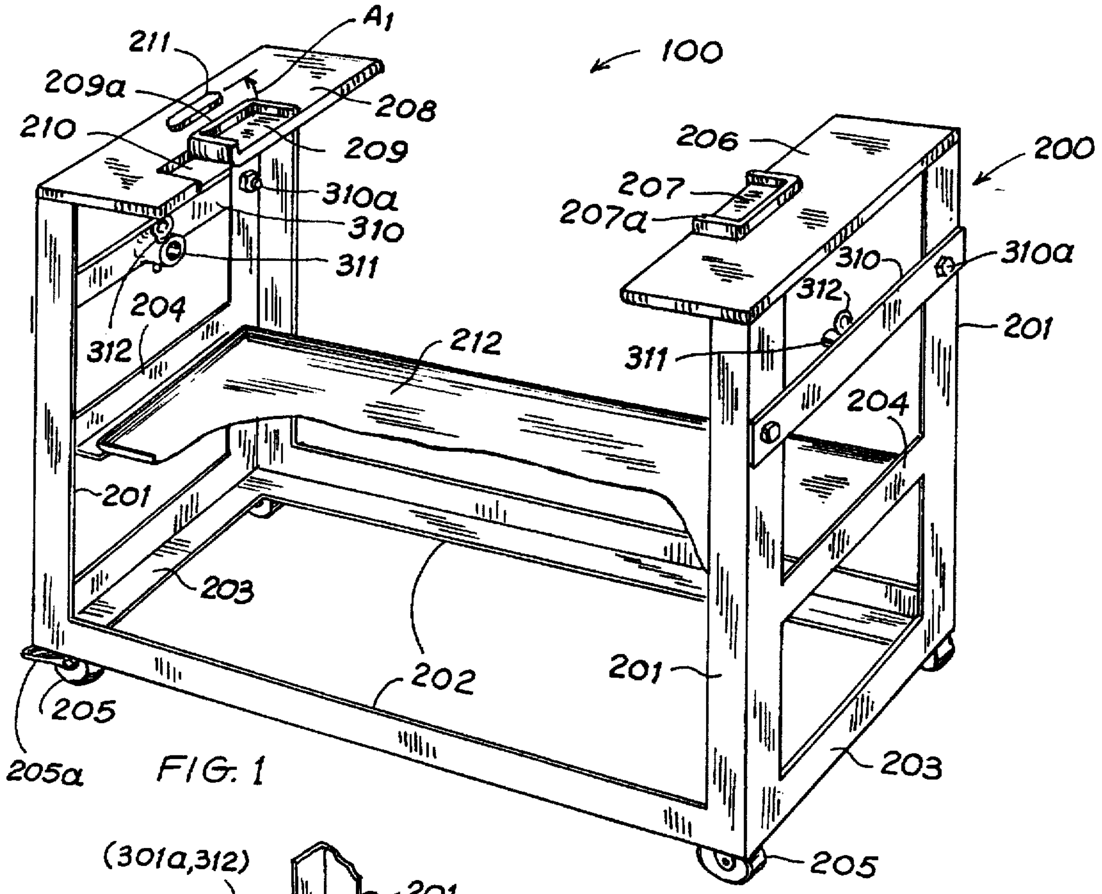
FIG. 1 illustrates a maintenance rack in accordance with the present invention showing a frame structure having an upper tier service member defining an open area flanked by support plates sized for servicing in a suspended support manner a first type of recloser equipment.
Figure 3:
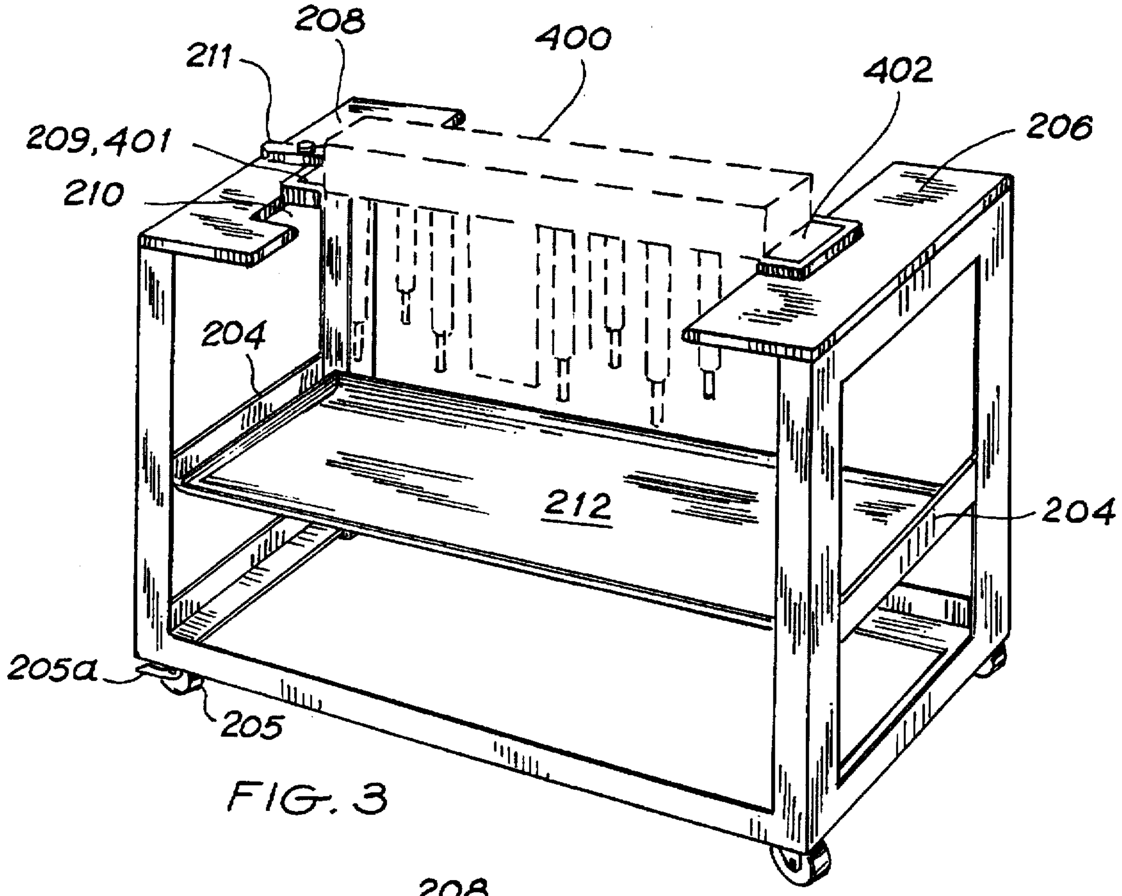
FIG. 3 illustrates a maintenance rack in accordance with FIG. 1 being utilized for servicing in a suspended support manner a first type of recloser equipment.

FIG. 1 illustrates a maintenance rack 100 in accordance with the present invention. Rack 100 is preferably constructed as a portable frame structure 200 having versatility for servicing multiple types of large electrical utility apparatus known as reclosers, see generally reclosers 400, 500 illustrated in FIGS. 3 and 6. FIG. 1 illustrates rack 100 having an upper tier service member that forms an open area for receiving a recloser, such as recloser 400, that is supported by opposing support plates 206, 208. The opening is determined and sized according to the physical outline of recloser 400, that includes a head that covers the recloser mechanism that is to be serviced.

FIG. 1 also shows frame 200 constructed having casters 205 with stops 205*a* that facilitates portability and safety. FIG. 1 shows frame 200 also having vertical members 201 and cross members 202, 203 and 204 that not only provide rigidity to frame structure 200, but also function to provide support for positioning a drip pan 212 that is useful for collecting fluids, such as oil contained within the recloser mechanism that needs to be drained prior to being serviced.

Figure 2:
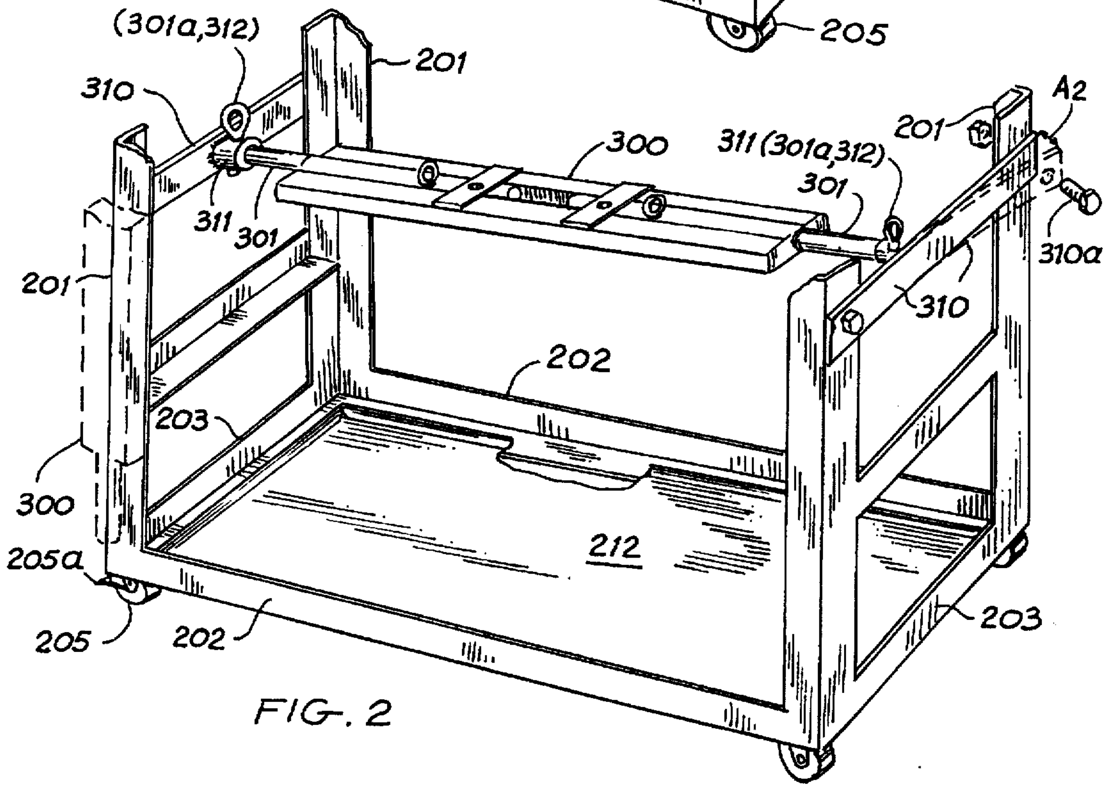
FIG. 2 illustrates a maintenance rack in accordance with the present invention showing a frame structure having a mid tier service member defined by a rotating bar member adapted for servicing a second type of recloser equipment.
Figure 5:
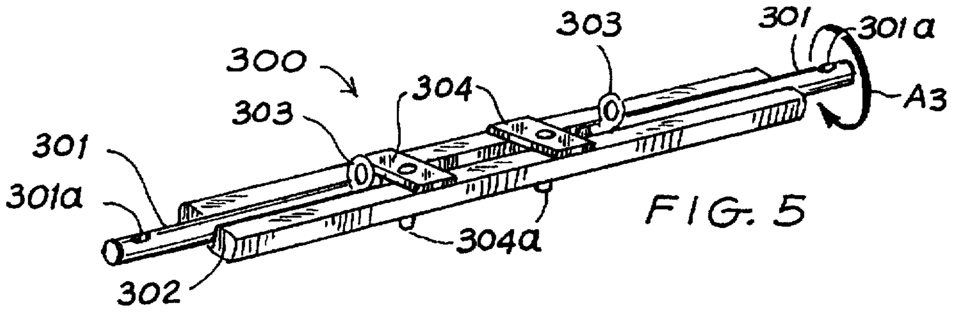
FIG. 5 illustrates a rotating bar member adapted for pivotal attachment to a maintenance rack frame structure in accordance with the present invention.

FIG. 1 also shows opposing pivots 311 that are preferably part of rack 100 for use in conjunction with rotatable bar 300, see FIG. 5. As best seen in FIG. 2, pivots 311, pin member 312 and rotatable bar 300 together form a mid tier service member for servicing a recloser, such as recloser 500. The pivots 311 are illustrated as being constructed as part of a cross members 310 that are detachable to vertical frame members 201 using bolt and nut attachment arrangement 310*a*. Rack 100 may be constructed solely with a mid tier service member, i.e. the upper tier service member may be omitted.

Figure 4:
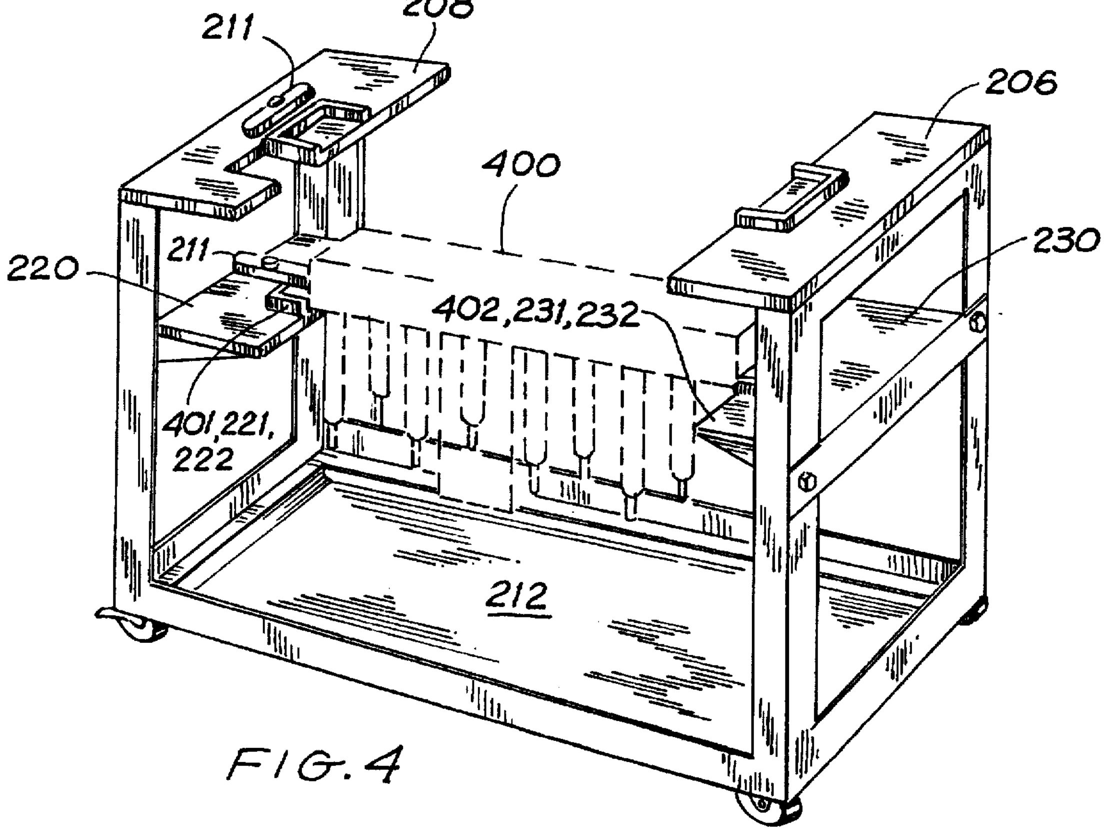
FIG. 4 illustrates a maintenance rack in accordance with FIG. 1 further adapted with a mid tier support plate arrangement for servicing in a suspended support manner the same first type of recloser equipment.

Reclosers 400 are known in the industry as type R or type W and must be serviced in a suspended manner. Traditionally, servicing of reclosers has been accomplished by placing them on tables, barrels to effect a suspended manner of servicing. Needless to say, the prior art service racks have not provided frame structure that prevents awkward, unsafe and uncomfortable servicing positions. Rack 100 and the upper service tier arrangement shown in FIG. 3 solves the problem and facilitates a suspended servicing option. To aid this manner of servicing, support plates 206, 208 are preferably formed having bordered regions 207, 209 delineated by borders 207*a*, 209*a* that are sized to fit end portions 401, 402 of recloser 400, see FIGS. 1 and 3. Latch 211 is designed to swivel as indicated by arrow A1 in FIG. 1 and is provided to secure recloser 400 to the support plates 206, 208 after initial placement of the recloser 400 on the upper tier. To aid in the disassembly process an access port 210 is provided on the support plates, by example, on plate 208. The disassembly process of reclosers typically includes removal of the head to gain access to the internal mechanism. Once the recloser mechanism is exposed, servicing of the internal components is easy and can be conducted at a comfortable height. FIG. 4 illustrates maintenance rack 100 modified with an add-on mid tier support plate arrangement 220, 230 for servicing recloser 400 in a suspended support manner but at a different and lower height. Support plates 220 to, 230 of the add-on plate arrangement are also provided with bordered regions 221, 231 defined by borders 222, 232 and a latch 211 for securing end portions 401, 402 of recloser 400 when positioned at the lower setting. Plate arrangement 22O, 230 is substantially the same as support plates 206, 208 except that access port 210 is not provided. Typically, add-on plates 220, 230 are used after the head assembly has been removed and the technician desires to have the recloser mechanism positioned at a lower height to gain access of internal components that are difficult to work on when the assembly is positioned on the upper tier. Thus, in the mid tier position an access port is not required. Rack 100 is designed to facilitate placement of drip pan 212 at a lower level as shown in FIG. 4.

Figure 6:
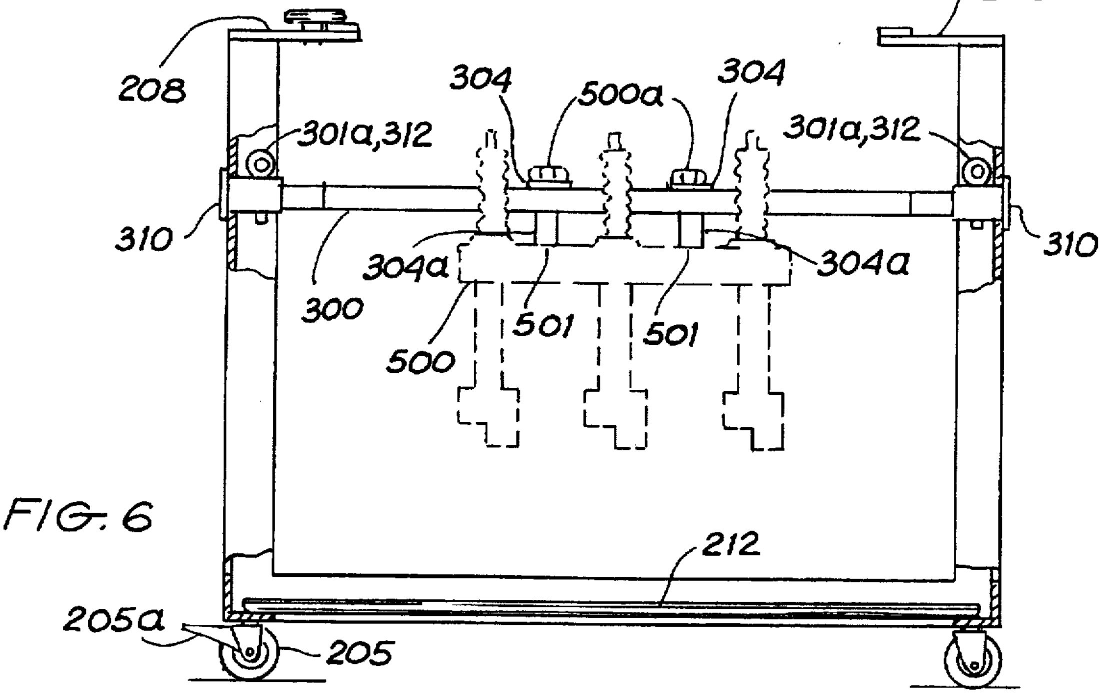
FIG. 6 illustrates a maintenance rack in accordance with FIG. 2 and a rotating bar in accordance with FIG. 5 being utilized for servicing a second type of equipment in a first position.
Figure 7:
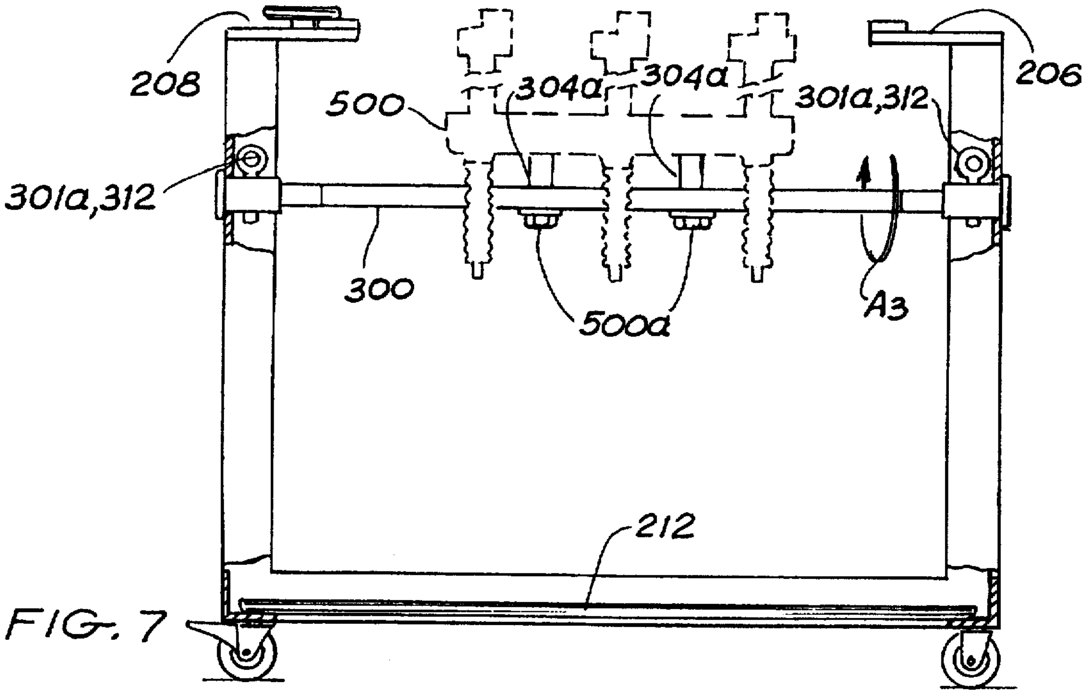
FIG. 7 illustrates a maintenance rack in accordance with FIG. 2 and a rotating bar in accordance with FIG. 5 being utilized for servicing a second type of reclosedr equipment in a second position different from the first position shown in FIG. 6.

FIG. 5 illustrates rotatable bar 300 which is designed for attaching a recloser of the type known in the electric power distribution industry as type 6H and V6h, designated by numeral 500 in FIGS. 6 and 7. Bar 300 is an elongated structure 302 having pivot ends 301 that mate with pivots 311. Pivot ends 301 are provided with holes 301*a* that facilitate securement of bar 300 with pins 312 after rotation as generally shown by arrow A3 in FIG. 5. Cross mounting plates 304 are spaced apart to match recloser anchor points 501. Anchor points 501 are the recloser attachment means that facilitate attachment of a mechanical interface for hoisting the recloser unit. Spacer bushings 304*a* are provided to aid in attachment of recloser 500 to bar 300. Lift bolts 303 facilitate hoist-lifting recloser 500 with attached bar 300, and positioning ends 301 within pivots 311. FIG. 2 shows bar 300 in a stored position hanging from vertical frame member 201, and also in pivot stored position, i.e. without recloser 500 attached. In the pivot stored position, or when positioning bar 300 and attached recloser 500 to rack 100, one end 301,311 is first pivotally positioned, and then the other end 301 is pivotally positioned by manipulation of end cross member 310 for attaching to pivot 311. FIG. 2 shows cross member 310 as being detachable, as indicated by arrow A2 , to frame member 201 using attachment bolt 310*a* to facilitate the manipulation. Ends 301 are secured by the pinning arrangement 301*a*, 312. FIG. 6 illustrates maintenance rack 100 with a recloser 500 attached to rotating bar 300 using mounting bolts 500*a* for servicing the mechanism in a first position. FIG. 7 illustrates maintenance rack 100 with a recloser 500 attached to rotating bar 300 using mounting bolts 500*a* for servicing the mechanism in a second position rotated as indicated by arrow A3. As previously discussed, rack 100 may be constructed to provide only the rotatable mid tier recloser 500 service arrangement, or may be constructed to provide only the upper/mid tier recloser 400 arrangement, or may be constructed to provide servicing capabilities for both types of recloser types.

Therefore, while the present invention has been shown and described herein in what is believed to be the most practical and preferred embodiment, it is recognized that departures can be made therefrom within the scope of the invention, which scope is therefore not to be limited to the details disclosed herein but is to be accorded the full scope of the claims so as to embrace any and all equivalent apparatus.

I claim:

1. A method of performing a maintenance task on a recloser device of the type used in the distribution of electrical energy and having bolt receiving mounting means to effect a suspended service task, said method comprising the steps of:

(a) providing said recloser device;

(b) providing a maintenance rack comprising:

a tiered frame structure;

a detachable service member formed to attach to said frame structure, said service member comprising a rotatable bar member mounted on opposing pivot support members that are attached to said frame structure, said rotatable bar member being formed having cross mounting plates for attaching to said mounting means on said recloser device for positioning said recloser device in a first service position and performing a first service task, said rotatable bar member being formed for facilitating rotation of said attached recloser to a secured second position and performing a second service task;

(c) attaching said rotatable bar to said recloser device using bolt means interconnecting said cross mounting plates to said bolt receiving mounting means;

(d) securing said rotatable bar with attached recloser device to said opposing pivot support members;

(e) rotating said bar and attached recloser to a desired service position; and (f) servicing said recloser device.

2. A method of performing a maintenance task on a first type of recloser device and a second type of recloser device, both recloser devices being of the type used in the distribution of electrical energy, said method comprising the steps of:

(a) providing said first type of recloser device, said first type of recloser device having a head cover requiring removal to gain access to service a recloser mechanism;

(b) providing a maintenance rack comprising:

a tiered frame structure;

a service member formed as part of said frame structure, said service member comprising a first support arrangement defining an open area flanked by a first and second support plate, said open area and each of said first and second support plates, being sized for accommodating a suspended support of said first type of recloser device for performing a service task; and a detachable service member formed to attach to said frame structure, said detachable service member comprising a rotatable bar member mounted on opposing pivot support members that are attached to said frame structure, said rotatable bar member being formed for attaching to said second type of recloser device for positioning said second type of recloser device in a first service position and performing a first service task, said rotatable bar member being formed for facilitating rotation of said attached second type of recloser device to a secured second position and performing a second service task;

(c) positioning said first type of recloser device within said open area;

(d) supporting said first type of recloser device on said first and second support plates;

(e) securing said first type of recloser device to said first and second support plates using a latch means;

(f) removing said head cover;

(g) servicing said first type of recloser device;

(h) removing said first type of recloser device from said maintenance rack;

(i) providing said second type of recloser device, said second type of recloser device having mounting means to effect a suspended service task;

(j) attaching said rotatable bar to said second type of recloser device using said mounting means;

(k) securing said rotatable bar with attached second type of recloser device to said opposing pivot support members;

(l) rotating said bar and attached second type of recloser device to a desired service position; and (m) servicing said second type of recloser device.

* * * * *